United States Patent
Schwindt

(10) Patent No.: US 8,504,275 B2
(45) Date of Patent: Aug. 6, 2013

(54) ADAPTIVE CRUISE CONTROL ACCELERATION RATE CONTROL

(75) Inventor: Oliver Schwindt, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 332 days.

(21) Appl. No.: 12/911,231

(22) Filed: Oct. 25, 2010

(65) Prior Publication Data

US 2012/0083987 A1 Apr. 5, 2012

Related U.S. Application Data

(60) Provisional application No. 61/388,316, filed on Sep. 30, 2010.

(51) Int. Cl.
*B60T 7/12* (2006.01)

(52) U.S. Cl.
USPC .............................. 701/96; 701/93; 701/301

(58) Field of Classification Search
USPC .............................................. 701/93, 96, 117
See application file for complete search history.

(56) References Cited

U.S. PATENT DOCUMENTS

| 7,266,453 | B2 | 9/2007 | Sawamoto et al. | |
|---|---|---|---|---|
| 7,308,961 | B2 * | 12/2007 | Satou et al. | 180/170 |
| 7,444,241 | B2 | 10/2008 | Grimm | |
| 8,265,850 | B2 * | 9/2012 | Shin | 701/93 |
| 2003/0135318 | A1 * | 7/2003 | Tellis et al. | 701/96 |
| 2003/0154016 | A1 * | 8/2003 | Manaka | 701/96 |
| 2005/0182551 | A1 * | 8/2005 | Sugano | 701/96 |
| 2006/0217866 | A1 * | 9/2006 | Moebus | 701/70 |
| 2007/0282513 | A1 | 12/2007 | Michi et al. | |
| 2009/0125203 | A1 * | 5/2009 | Lindqvist et al. | 701/96 |
| 2009/0240408 | A1 | 9/2009 | Wolfgang et al. | |
| 2009/0248270 | A1 | 10/2009 | Sekiguchi | |
| 2009/0254260 | A1 | 10/2009 | Nix et al. | |
| 2009/0299598 | A1 * | 12/2009 | Boecker et al. | 701/96 |
| 2010/0023183 | A1 | 1/2010 | Huang et al. | |
| 2010/0198478 | A1 * | 8/2010 | Shin | 701/96 |

FOREIGN PATENT DOCUMENTS

| DE | 102008057367 | 5/2010 |
|---|---|---|
| GB | 318371 | 9/1929 |

OTHER PUBLICATIONS

Fct/US2011/052421 International Search Report and Written Opinion dated Nov. 15, 2011 (11 pages).

* cited by examiner

*Primary Examiner* — Helal A Algahaim
(74) *Attorney, Agent, or Firm* — Michael Best & Friedrich LLP

(57) ABSTRACT

An adaptive cruise control system for a host vehicle. The adaptive cruise control system includes a sensor and a controller. The sensor is configured to detect a vehicle in front of the host vehicle. The controller receives an indication of the detected vehicle from the sensor and is configured to maintain a speed of the host vehicle at a desired speed, to determine a speed of the detected vehicle relative to the host vehicle, and adjust an acceleration rate of the host vehicle based on the relative speed.

14 Claims, 4 Drawing Sheets

ADAPTIVE CRUISE CONTROL ACCELERATION RATE CONTROL

RELATED APPLICATIONS

The present application claims the benefit of prior filed U.S. Provisional Patent Application No. 61/388,316 filed on Sep. 30, 2010, the entire content of which is hereby incorporated by reference.

BACKGROUND

The invention relates to an adaptive cruise control (ACC) for motor vehicles, having a sensor system for locating preceding vehicles and a controller which regulates the speed of the vehicle and/or the clearance from a preceding vehicle, based on specified control parameters. Specifically, the invention relates to an ACC that detects and reacts to slow traffic and controls the speed of a vehicle to account for the slow traffic.

Clearance and speed controllers for motor vehicles are designated as ACC systems. They typically have a radar sensor by which the clearances and relative speeds of preceding vehicles can be measured. In this way, it is possible to follow a directly preceding vehicle, a so-called target object, at a suitable distance or, more accurately, at a suitably selected time gap. In a clear-lane mode, when no target object is present, regulation takes place to a set point speed that is, for instance, a desired speed selected by the driver.

SUMMARY

In one embodiment, the invention provides an adaptive cruise control system for a host vehicle. The adaptive cruise control system includes a sensor and a controller. The sensor is configured to detect a vehicle in front of the host vehicle. The controller receives an indication of the detected vehicle from the sensor and is configured to maintain a speed of the host vehicle at a desired speed, to determine a speed of the detected vehicle relative to the host vehicle, and adjust an acceleration rate of the host vehicle based on the relative speed.

In another embodiment the invention provides a method of operating an adaptive cruise control system for a host vehicle. The method includes obtaining an indication of a desired speed for the host vehicle, accelerating the host vehicle at a rate when a speed of the host vehicle is less than the desired speed, operating the vehicle at a speed substantially equal to the desired speed, detecting a vehicle in front of the host vehicle, determining a speed of the vehicle relative to the speed of the host vehicle, and reducing the rate a first amount based on the relative speed.

Other aspects of the invention will become apparent by consideration of the detailed description and accompanying drawings.

DETAILED DESCRIPTION

Figure 1:
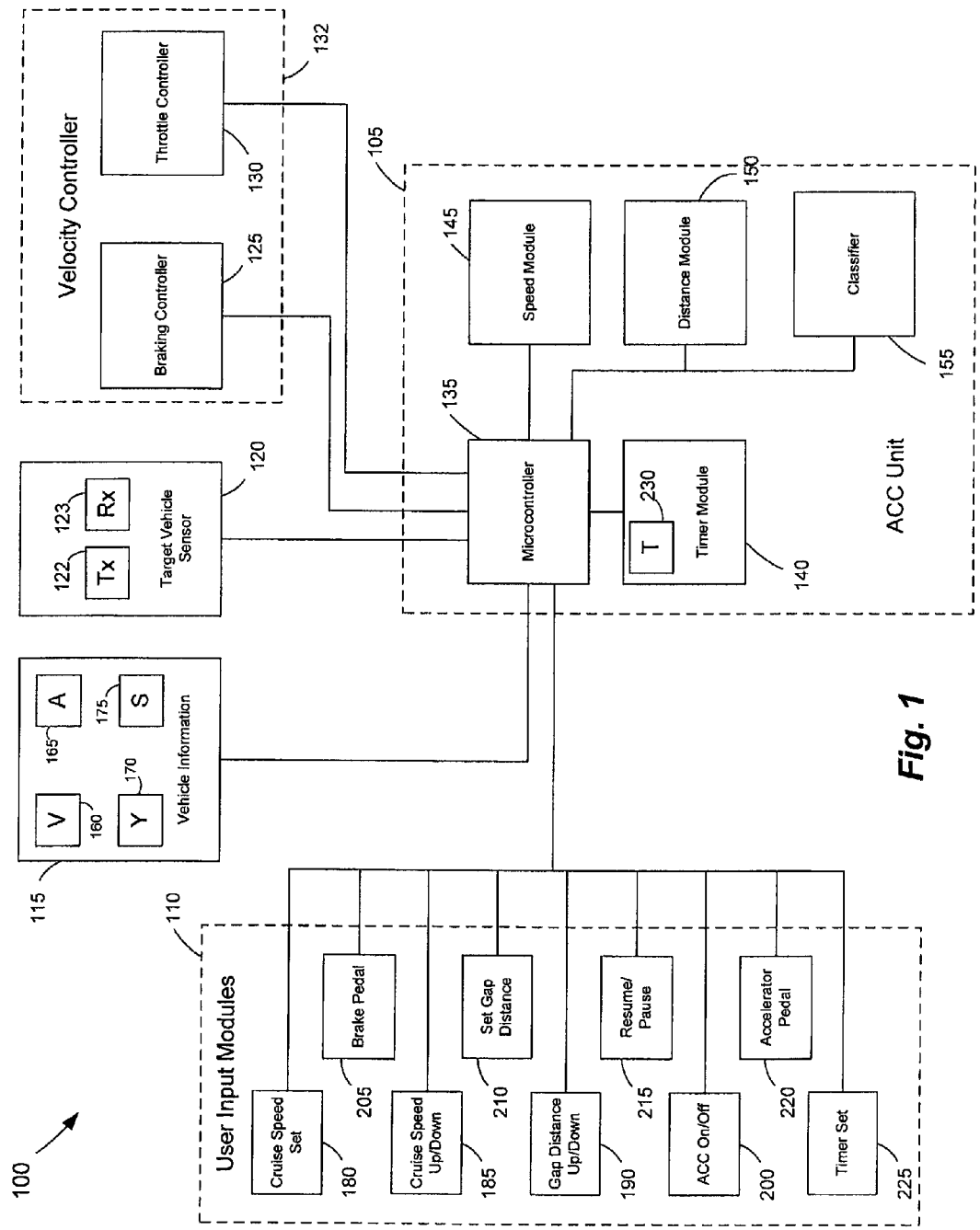
FIG. 1 is a block diagram of an embodiment of an adaptive cruise control system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium). As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

An adaptive cruise control ("ACC") is similar to a traditional cruise control, but uses additional sensing equipment to detect other objects, e.g., a target vehicle in front of and in the same lane as the user's vehicle. For example, a user sets a vehicle speed to 60 miles per hour ("mph") and, while proceeding at 60 mph under control of the ACC, the vehicle approaches a slower-moving, target vehicle in the same driving lane, the ACC causes the vehicle to slow down. The ACC uses throttle and brake controls to first reduce the speed of the host vehicle. Then, the ACC controls the speed of the host vehicle to maintain a particular distance between the host vehicle and the target vehicle. The particular distance is based on user selection, sensed weather conditions, sensed road conditions, and other factors. The ACC controls the speed of the host vehicle to be at the lesser of 1) the speed necessary to maintain the particular distance and 2) the user-set speed. If the host vehicle changes lanes, or the target vehicle changes lanes or otherwise is no longer detected by the ACC, and no new target vehicle within the particular distance is detected, the ACC causes the vehicle to accelerate and then maintain the user-set speed.

In some embodiments, an ACC system includes three modes: 1) a set speed mode, 2) a following mode, and 3) a target lost mode. In the set speed mode, the ACC system controls the speed of the host vehicle to maintain the set cruise speed. In some embodiments, if the host vehicle approaches another, slower moving, vehicle, the ACC system provides a warning to the driver, disengages, and/or enters the following mode. In the following mode, the ACC system controls the host vehicle to follow a detected target vehicle at a desired gap distance. In the target lost mode, the ACC system maintains the current velocity for a predetermined period of time to allow the target vehicle to reappear (e.g., when going around a corner or up/down a hill). The user can override or cancel any of these modes by depressing the brake pedal or switching the ACC system off using a user-interface control within the vehicle.

In the set speed mode, occasionally the vehicle is traveling below the target speed (e.g., when driving up a hill or when a slower target vehicle changes lanes and the ACC system enters the set speed mode). The ACC system detects this slowing down and accelerates the vehicle to reach the target speed. The rate of acceleration is preset and can be a constant rate or a rate that varies based on the difference between the vehicle's actual speed and desired speed. The rate of acceleration can be set to provide a smooth ride and an optimum rate for fuel consumption.

In some circumstances, acceleration of the vehicle by the ACC system may appear to occupants of the vehicle as improper, for example, when approaching a red light, a traffic backup, or a reduced speed limit. In these instances, the occupants see the slower moving vehicles in the distance beyond where the ACC system selects vehicles as target objects. In spite of these slow moving vehicles, the ACC system may implement an acceleration causing the vehicle to move faster toward stopped or slow moving vehicles. Therefore, it is desirable for the ACC system to modify the rate of acceleration when these circumstances occur.

FIG. 1 depicts an ACC system 100. The ACC system 100 includes an ACC unit 105, user input modules 110, a vehicle information module 115, a target vehicle sensor 120, a braking controller 125, and a throttle controller 130. The braking controller 125 and throttle controller 130 are part of a velocity controller 132 of the host vehicle. The ACC unit 105 includes a microcontroller 135, timer module 140, speed module 145, a distance module 150, and an acceleration rate classifier 155.

The target vehicle sensor 120 is positioned on a host vehicle such that it can detect a target vehicle in front of the host vehicle. The sensor 120 outputs target vehicle information to the microcontroller 135. In some embodiments, the target vehicle sensor 120 is a microwave radar sensor that uses a frequency-modulated, continuous wave ("FMCW") technique to sense objects. The target vehicle sensor 120 uses a transmitter 122 to emit an FMCW signal at approximately 76.5 GHz. The emitted wave is reflected off of a target vehicle, received by the target vehicle sensor 120 at receiver 123, and processed to provide a relative speed of the target vehicle, a distance between the vehicles, and a relative acceleration of the target vehicle. The signal processing of the reflected wave is performed within either the target vehicle sensor 120, the ACC unit 105 (e.g., the microcontroller 135), or a combination thereof.

The target vehicle sensor 120 also indicates a lateral position of the target vehicle or the target vehicle's angle relative to the host vehicle's longitudinal axis using, for instance, multi-beam techniques. This angular information is used to accurately select a target vehicle, for instance, when multiple potential target vehicles are detected. The target vehicle sensor 120 has an average output microwave power of less than 1 mW. In other embodiments, the target vehicle sensor 120 uses a different sensing technology, such as radar (radiowave-based), lidar (light-based), sonar (sound-based), a different FMCW implementation, or a combination thereof.

The microcontroller 135 also receives host vehicle status information from the vehicle information module 115. Vehicle status information includes, for instance, the current vehicle speed, acceleration/deceleration rate, yaw rate, and steering angle, provided by a velocity sensor 160, an acceleration sensor 165, a yaw rate sensor 170, and a steering angle sensor 175, respectively. The microcontroller 135 also receives information from the user input modules 110 including a cruise speed set module 180, cruise speed up/down module 185, gap distance up/down module 190, ACC on/off module 200, brake pedal module 205, set gap distance module 210, ACC resume/pause module 215, an accelerator pedal module 220, and a timer set module 225. In some embodiments, fewer or more user input modules 110 are included in the ACC system 100. For instance, in some embodiments, the timer set module 225 is not included.

The ACC on/off module 200 is a switch, push-button, or similar device on a user interface within the vehicle cab that is used to selectively enable and disable the ACC unit 105. In some embodiments, operation of the ACC unit 105 is enabled by a "set" switch and an on/off switch is not included. The cruise speed set module 180 is used to select a cruise speed of the vehicle operating in the set speed mode. The cruise speed up/down module 185 is used to increase and decrease a previously selected cruise speed. The set gap distance module is used to select a desired gap distance between the host vehicle and a target vehicle that the ACC system 100 will maintain while operating in the following mode. The gap distance up/down module 190 is used to increase and decrease a previously selected desired gap distance. The resume/pause module 215 is used to pause or resume the enabled ACC unit 105. The brake pedal module 205 and accelerator pedal module 220 monitor the host vehicle's brake and accelerator pedal and indicate to the microcontroller 135 the extent to which either is depressed by the driver.

The braking controller 125 receives braking signals from the microcontroller 135. In response to receiving braking signals, the braking controller 125 controls the host vehicle's braking system to output a braking force that slows the vehicle. The throttle controller 130 receives throttle input signals from the microcontroller 135. In response to receiving throttle input signals, the throttle controller 130 either controls the vehicle's engine to increase the vehicle speed or decrease the vehicle speed. In some embodiments, the throttle controller 130 or a separate transmission controller (not shown) is used in an automatic transmission vehicle to decrease the vehicle speed by down shifting.

The microcontroller 135 communicates with the timer module 140, speed module 145, and distance module 150 to share information between them and other components of the ACC system 100. The speed module 145 receives the current vehicle speed from the vehicle information module 115 and the set cruise speed from the user input modules 110. The speed module 145 determines and outputs to the microcontroller 135 an indication of whether the current vehicle speed is greater than the set cruise speed, less than the set cruise speed, or within an acceptable range of the set cruise speed (e.g., within 0.5 mph).

The distance module 150 receives the desired gap distance from the user input modules 110 and, if a target vehicle is detected, the current relative distance between the target vehicle and the host vehicle. The distance module 150 determines and outputs to the microcontroller 135 an indication of whether the current relative distance is greater than the desired gap distance, less than the desired gap distance, or within an acceptable range of the desired gap distance (e.g., within 0.5 meters).

The timer module 140 receives a lost target indication from the microcontroller 135 and includes lost target timer 230. The lost target timer 230 starts counting upon receiving a lost target indication from microcontroller 135. In some embodiments, for instance, the lost target timer 230 counts up until a delay time has elapsed. In other embodiments, the lost target timer 230 is set with a delay time and counts down to zero.

The microcontroller 135 analyzes the outputs of the speed module 145, distance module 150, and timer module 140 to control the host vehicle using the braking controller 125 and throttle controller 130. Although shown separately in FIG. 1, various combinations of the speed module 145, timer module 140, distance module 150, braking controller 125, and throttle controller 130 may be included within the microcontroller 135. Furthermore, the ACC system 100 and its components may include hardware (e.g., a microprocessor, discrete components, a field programmable gate array or application specific integrated circuit), software, or a combination thereof.

Figure 2:
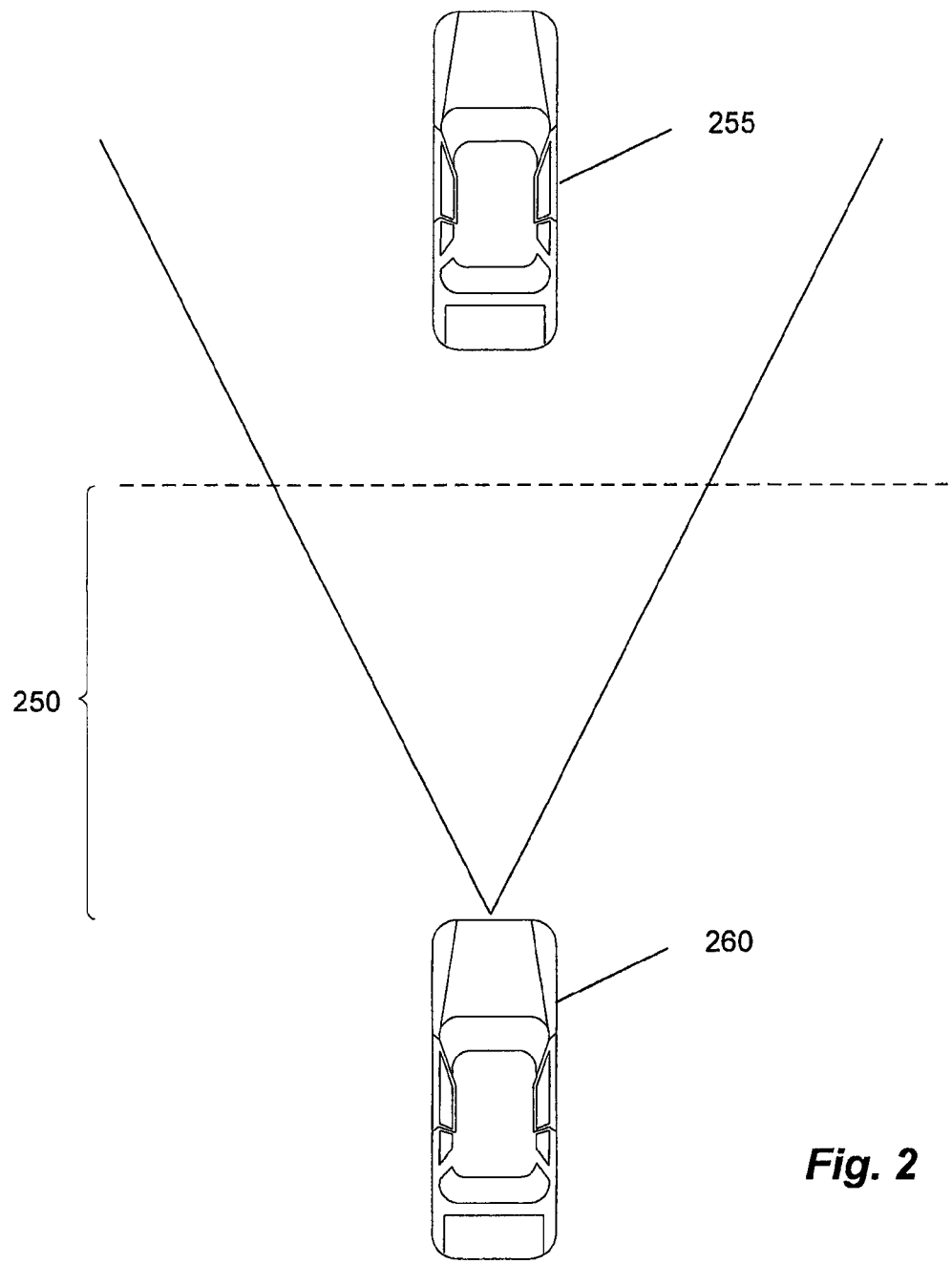
FIG. 2 illustrates a range selection limit for an adaptive cruise control system.
Figure 3A:
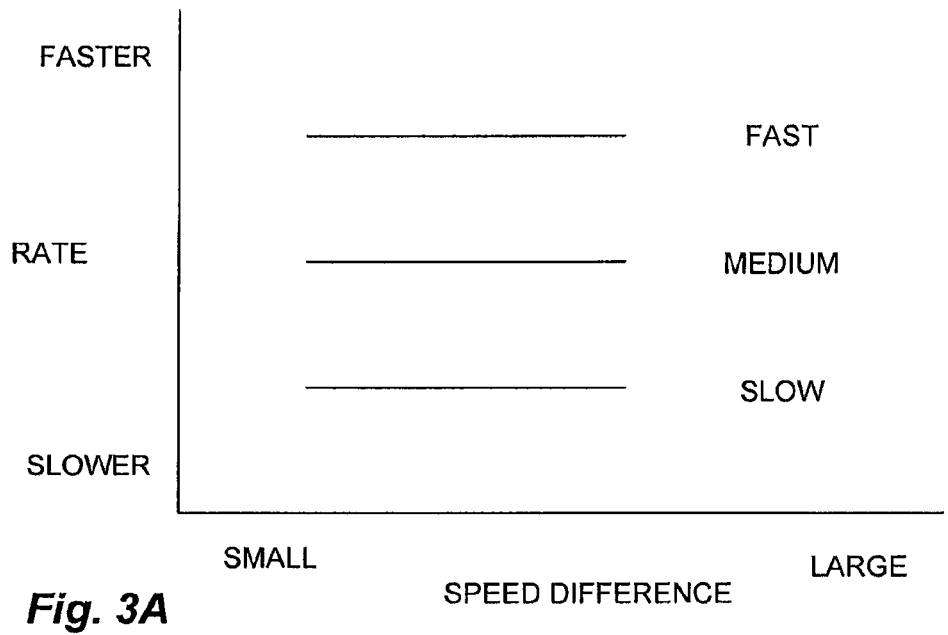
FIG. 3A is a graph showing different preset acceleration rates for an adaptive cruise control system.
Figure 3B:
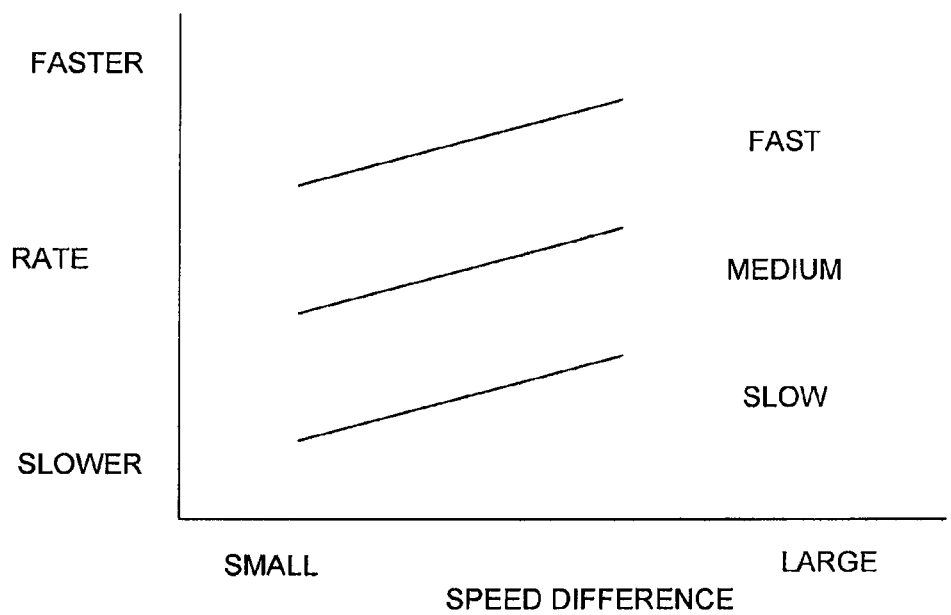
FIG. 3B is a graph showing different variable acceleration rates for an adaptive cruise control system.

FIG. 2 shows a range selection limit 250 for sensor 120. The range selection limit 250 is the range in which the sensor 120 can accurately detect whether a vehicle 255 is in the same lane as a host vehicle 260. Vehicles detected within the range selection limit 250 can be used by the ACC system 100 as target vehicles for operating in the following mode. The acceleration rate classifier 155 uses vehicles 255 that are detected beyond the range selection limit 250 to classify the chance of the host vehicle needing to slow down or brake as "unlikely," "probable," or "highly likely." Embodiments of the invention can include any number of classifications including a continuous implementation. For simplicity and understandability, three classes are used in the present description. When the ACC system 100 calls for acceleration (e.g., when the driver taps up the set speed, the resume button is pressed, a target vehicle changes lanes and the set speed is greater than the speed at which the target vehicle was traveling, etc.), the ACC system 100 determines a rate of acceleration based on the classification. In some embodiments, there are three rates of acceleration: fast, medium, and slow. The slow acceleration rate may be zero, i.e., not accelerating at all. The acceleration rates can be fixed (as shown in FIG. 3A) or variable (as shown in FIG. 3B).

For example, the fast rate of acceleration can be preset such that the host vehicle will get to the desired speed quickly but smoothly or the fast rate of acceleration can vary over a range of rates, preferably with a predetermined maximum and/or minimum rate, depending on how much the speed of the host vehicle differs from the desired speed (e.g., the acceleration rate is faster when the difference between the actual and desired speeds is relatively large compared to the acceleration rate when the speed difference is relatively small). When the ACC system 100 calls for acceleration, the system 100 uses the fast rate of acceleration when the probability of slowing down/braking is unlikely, uses the medium rate of acceleration when the probability of slowing down/braking is probable, and uses the slow rate of acceleration when the probability of slowing down/braking is highly likely. The slower rates of acceleration can result in improved fuel economy and a better driving experience (e.g., the occupants of the host vehicle do not experience excess acceleration when they see slow or stopped vehicles ahead).

Figure 4:
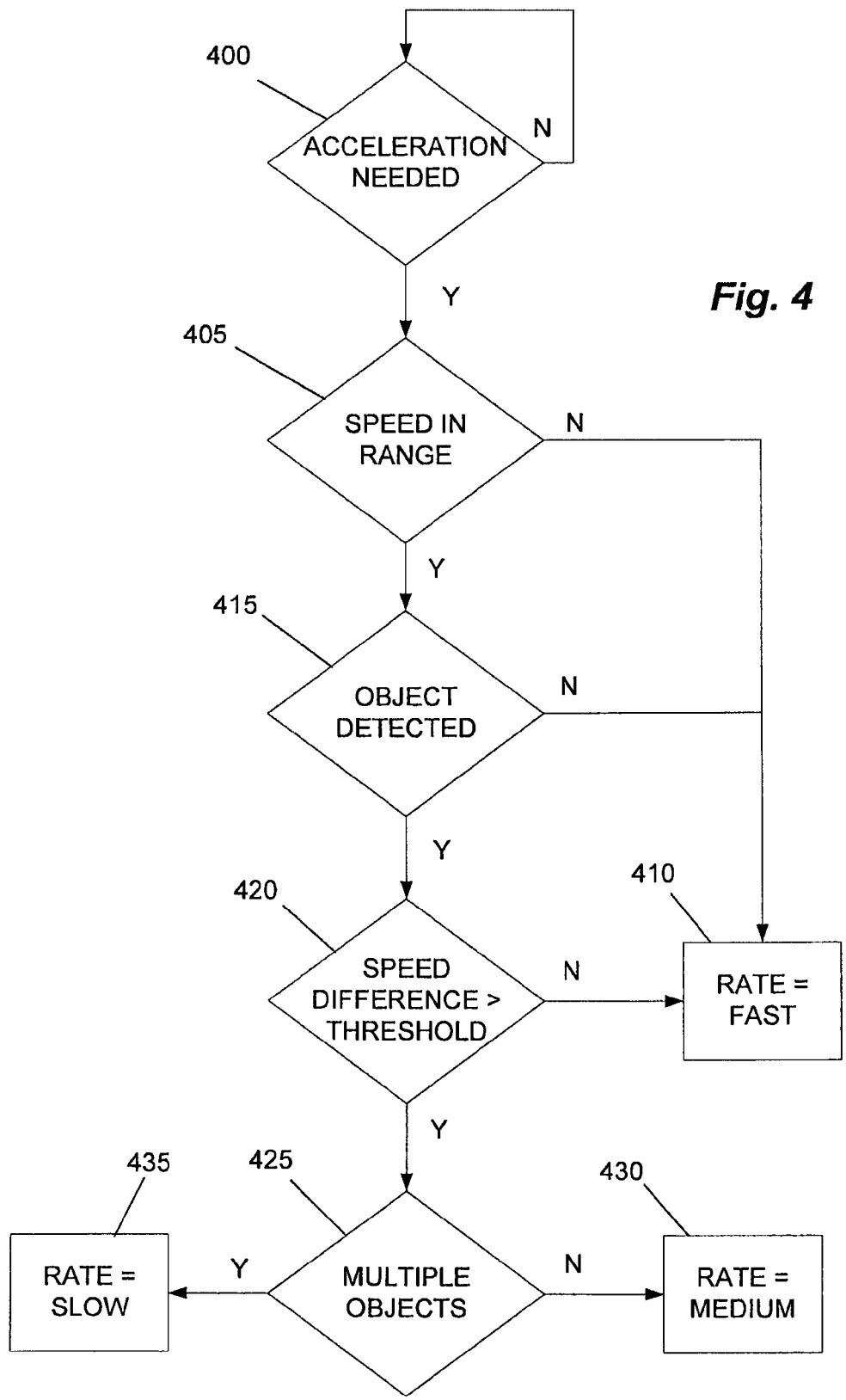
FIG. 4 illustrates operation of an acceleration rate classifier for an adaptive cruise control system.

FIG. 4 shows an embodiment of the operation of an acceleration rate classifier 155 for an ACC system 100. The ACC system 100 determines if acceleration of the host vehicle is needed (step 400). If acceleration is called for, the ACC system 100 determines if the speed of the host vehicle is within an optional predetermined speed range (e.g., about 40 to 60 miles per hour (mph)) (step 405). If the speed of the host vehicle is not within the range, the classifier uses the fast acceleration rate (step 410). The speed range provides a balance between optimum fuel economies while eliminating false detections outside of the range. In some embodiments, an upper or lower threshold is used rather than a speed range. For example, the classifier may operate at all speeds below about 60 mph or at all speeds above about 30 mph. The upper limit can be chosen to reduce false detections at speeds where little fuel economy benefits exist, and where the probability of encountering slower traffic is lower (e.g., on the freeway). The lower limit can be chosen to limit implementation of the operation to times when the likelihood of encountering a large quantity of stop lights is reduced (e.g., stop lights tend to be used less on roads having higher speed limits).

If the speed is within the range (step 405), the classifier 155 checks for vehicles beyond the range selection limit (step 415). If no vehicles are detected, the classifier determines that the chance of slowing down/braking is unlikely, and sets the acceleration rate at the fast level (step 410). However, if one or more vehicles are detected beyond the range selection limit, the classifier 155 checks if the speed of the host vehicle is greater than the speed of the vehicle(s) by more than a predetermined threshold (e.g., 20 mph) (step 420). If the difference in speed between the detected vehicle and the host vehicle is less than the threshold, the ACC system 100 is able to react sufficiently such that the acceleration rate does not have to be reduced. Thus, the classifier 155 sets the rate to fast (step 410). If the speed difference is greater than the threshold, the classifier determines if more than one vehicle is detected going sufficiently slower than the host vehicle (step 425). If only one vehicle is detected that fits the criteria, the classifier 155 determines that the chance of slowing down/braking is probable, and sets the acceleration rate to medium (step 430). If multiple vehicles are detected that fit the criteria, the classifier determines that the chance of slowing down/braking is highly likely, and sets the acceleration rate to slow (step 435).

Various features of the acceleration rate classifier 155 have been described above. Additional features of the classifier 155 may include taking into account the actual speed of the host vehicle in determining an acceleration rate, taking into account the relative speed of the slower vehicles detected ahead of the host vehicle in determining an acceleration rate, and operating to control acceleration of the host vehicle when the ACC system is operating in the following mode.

Various features and advantages of the invention are set forth in the following claims.

What is claimed is:

1. An adaptive cruise control system for a host vehicle, comprising:
   a sensor configured to detect a vehicle in front of the host vehicle; and
   a controller receiving an indication of a detected vehicle from the sensor, the controller configured to
      maintain a speed of the host vehicle at a desired speed,
      determine a speed of the detected vehicle relative to the host vehicle,
      adjust an acceleration rate of the host vehicle based on the relative speed
   wherein the controller reduces the acceleration rate a first amount when the relative speed indicates the host vehicle is traveling more than a predetermined threshold faster than the detected vehicle, and the controller reduces the acceleration rate a second amount when the relative speed indicates the host vehicle is traveling more than the predetermined threshold faster than two or more detected vehicles.

2. The adaptive cruise control system of claim 1, wherein the acceleration rate is adjusted based on a quantity of the vehicles detected by the sensor.

3. The adaptive cruise control system of claim 1, wherein the second amount is greater than the first amount.

4. The adaptive cruise control system of claim 1, wherein the detected vehicle is beyond a range selection limit.

5. The adaptive cruise control system of claim 1, wherein the controller reduces the acceleration rate when the detected vehicle is traveling more than a predetermined threshold slower than the host vehicle.

6. The adaptive cruise control system of claim 1, wherein the adaptive cruise control system operates in at least one of set speed mode, a following mode, and a target lost mode.

7. The adaptive cruise control system of claim 6, wherein the controller adjusts the acceleration rate when the adaptive cruise control system is operating in a set speed mode.

8. The adaptive cruise control system of claim 1, further comprising a plurality of vehicle information sensors, a plurality of inputs, and a velocity controller all coupled to the controller.

9. The adaptive cruise control system of claim 1, wherein the acceleration rate is varied based on a magnitude of a difference between an actual speed of the host vehicle and the desired speed.

10. A method of operating an adaptive cruise control system for a host vehicle, the method comprising:
   obtaining, by the adaptive cruise control system, an indication of a desired speed for the host vehicle;
   accelerating, by the adaptive cruise control system, the host vehicle at a rate when a speed of the host vehicle is less than the desired speed;
   operating, by the adaptive cruise control system, the host vehicle at a speed substantially equal to the desired speed;
   detecting, by the adaptive cruise control system, a vehicle in front of the host vehicle;
   determining, by the adaptive cruise control system, a speed of the vehicle relative to the speed of the host vehicle;
   reducing, by the adaptive cruise control system, the rate a first amount when the relative speed indicates the host vehicle is traveling more than a predetermined threshold faster than the detected vehicle;
   detecting, by the adaptive cruise control system, a second vehicle in front of the host vehicle;
   determining, by the adaptive cruise control system, a speed of the second vehicle relative to the speed of the host vehicle; and
   reducing, by the adaptive cruise control system, the rate a second amount when the relative speeds indicate the host vehicle is traveling more than the predetermined threshold faster than the detected vehicle and the second detected vehicle.

11. The method of claim 10, wherein the rate is not reduced unless the host vehicle is traveling more than a predetermined threshold faster than a detected vehicle.

12. The method of claim 10, wherein the rate is not reduced when the desired speed is less than a threshold.

13. The method of claim 10, wherein the rate in not reduced when the desired speed is greater than a threshold.

14. The method of claim 10, wherein a detected vehicle is beyond a range selection limit.

* * * * *